United States Patent

Uhl

[11] Patent Number: 6,088,097
[45] Date of Patent: Jul. 11, 2000

[54] POINT-SCANNING LUMINESCENT MICROSCOPE

[76] Inventor: Rainer Uhl, Bahnhofstrasse 89, 82166 Gräfelfing, Germany

[21] Appl. No.: 09/231,902

[22] Filed: Jan. 14, 1999

[30] Foreign Application Priority Data

Jan. 14, 1998 [DE] Germany ............................ 198 01 139

[51] Int. Cl.$^7$ .................................................. G01J 21/64
[52] U.S. Cl. ........................................ 356/318; 250/458.1
[58] Field of Search ................................. 356/317, 318, 356/417; 250/458.1, 459.1, 461.1, 461.2

[56] References Cited

U.S. PATENT DOCUMENTS

| | | |
|---|---|---|
| 5,363,190 | 11/1994 | Inaba et al. . |
| 5,394,268 | 2/1995 | Lanni et al. . |
| 5,557,452 | 9/1996 | Harris . |
| 5,751,417 | 5/1998 | Uhl . |
| 5,995,281 | 11/1999 | Simon et al. ........................ 359/368 |

FOREIGN PATENT DOCUMENTS

| | | |
|---|---|---|
| 0 718 656 | 6/1996 | European Pat. Off. . |
| 37 42 806 | 7/1989 | Germany . |
| 42 28 366 | 3/1994 | Germany . |
| 43 38 578 | 5/1994 | Germany . |
| 195 10 102 | 10/1996 | Germany . |

OTHER PUBLICATIONS

Patent Abstracts of Japan 09203739, Aug. 5, 1997, Nikon Corp., English Abstract.
Patent Abstracts of Japan 07311029, Nov. 28, 1995, Hitachi Constr Mach Co Ltd, English Abstract.
Patent Abstracts of Japan 07174768, Jul. 14, 1995, Olympus Optical Co Ltd, English Abstract.
Patent Abstracts of Japan 07134132, May 23, 1995, Olympus Co Ltd, English Abstract.

Primary Examiner—F. L. Evans
Attorney, Agent, or Firm—Nixon Peabody LLP; David S. Safran

[57] ABSTRACT

A point-scanning luminescent microscope, especially for studying biological objects, has at least one collimated light source for producing an excitation light beam, an optical arrangement which focuses the light of the excitation light source on an object to be studied, at least one detector arrangement for acquiring light emitted by the object, an optical arrangement which collects the light emitted by the object and supplies it to the detector arrangement, and a scanner arrangement which causes relative movement between the scanning light beam and the object in at least two directions. The scanner arrangement has piezoactuators for achieving scanning movements between the scanning light beam and object. The detector arrangement can have a surface sensor which forms a confocal diaphragm. The light source can be designed to deliver rectangular pulses. When the microscope is designed for twin-photon fluorescent microscopy, an objective lens is provided for illuminating the object and can be is used, at the same time, for collecting some of the photons emitted by the object, and a second detector is provided behind a condenser lens of the objective lens.

21 Claims, 9 Drawing Sheets

POINT-SCANNING LUMINESCENT MICROSCOPE

BACKGROUND OF THE INVENTION

1. Field of the Invention

The invention relates to a point-scanning luminescent microscope, especially for studying biological objects, with at least one collimated light source for producing an excitation light beam, an optical arrangement which focuses the light of the excitation light source onto the object to be examined, at least one detector arrangement for acquiring the light emitted by the object, an optical arrangement which collects the light emitted by the object and sends it to the detector arrangement, and a scanner arrangement which causes relative movement between the scanning light beam and the object in at least two directions.

2. Description of Related Art

FIG. 1 shows a schematic of a luminescent microscope of the type to which the present invention is directed and which is also called a scanning microscope. The important assemblies of the luminescent microscope shown here are:

- a collimated light source 10, generally a laser, for excitation of the object 12;
- an optical arrangement which is designated 14 as a whole and which focuses the light of the excitation source 10 as an illumination spot, especially as a diffraction-limited spot, onto the object 12, and which, at the same time, collects the emitted light again and sends it to a detector 16 or 18 (see below),
- a scanning device moves either the illumination spot relative to the object to be examined (scanning device 20) or the object to be examined relative to the spot (scanning device 22) and thus is used for scanning, and
- one or more detectors 16 or 18 for recording the light emitted from the object 12.

Such a point-scanning luminescent microscope can be designed especially as a confocal microscope and/or as a microscope which operates using the twin-photon or multi-photon process.

In the first case, the detector(s) is(are) positioned behind a confocal diaphragm 24 (detector position 16) which is attached in the image plane at a point conjugate to the illuminated object point. As FIG. 1 shows, here, the beam path of the light emitted by the object 12 to be examined runs via the optical arrangement 14, which is used to focus the excitation light onto the object, and via a dichroitic beam splitter 26, which separates the emission light from the excitation light, and a lens 28 to the confocal diaphragm 24 and the detector located in the detector position 16. In this way, light from other planes is largely masked as the focal plane of interest and three-dimensional scanning becomes possible.

In one special form of the scanning luminescent microscope indicated above, the sample is excited by a nonlinear twin-photon or multi-photon process which per se is limited to the focal plane and this, in most cases, makes a confocal diaphragm unnecessary. In this case, it is not necessary to allow the emitted light to pass through the entire optical arrangement backwards. A detector can also be placed directly behind the objective lens (no "descanning"). As indicated in FIG. 1, for this reason, in the beam path of the microscope 14, i.e. between the objective lens 32 and the tube lens 34, there can be a dichroitic beam splitter 30 so that the light emitted by the object is decoupled from the beam path directly after passing through the objective lens 32 and is imaged via another tube lens 36 onto the detector located in the detector position 18. The light collected at a given time always originates from the focal point which has just been illuminated, as dictated by the principle.

Although promising results have been obtained with a luminescent microscope built in this way, there a need for further improvements in this area.

SUMMARY OF THE INVENTION

Therefore, a primary object of this invention is especially to provide a luminescent microscope of the initially mentioned type with increased scanning speed, better resolution, higher collection efficiency and/or simplified structure.

To achieve this object, in accordance with the present invention, the scanner arrangement of a point-scanning luminescent microscope of the initially mentioned type has piezoactuators to achieve scanning movements between the scanning light beam and the object.

In almost all concepts implemented to date, the spot used for illumination is moved by galvanometric scanners in two dimensions over the visual field, for which reason this process is called the point scan process. Galvanometer scanners have a limited speed, especially when individual points are to be "approached" in a controlled manner. Therefore, generally, line scanning is chosen, the scanner used for line scanning moving sinusoidally, while the scanner orthogonal thereto must execute simply one linear movement within an image. The sinusoidal motion is only a poor approximation of the inherently desirable sawtooth motion. Its main disadvantage is that, even if constantly changing exposure times are tolerated, only a fraction of the entire scanning time can be used to collect data and a large part of the preparation (specifically, the part located on the turning points) is exposed to harmful observation light, although it is not to be observed at all. These problems can be surmounted or largely minimized according to this invention because the piezoactuators used enable fundamentally faster movements.

As mentioned initially with reference to the scanning devices shown at 20 and 22 in FIG. 1, relative motion between the scanning light beam and the objects can be effected either by moving the object or by moving the scanning light beam. Therefore, in order to force the scanning light beam to scanning motion in the pertinent scanning direction, for each scanning direction of the scanning light beam, there can be an optical element which is coupled to a piezoactuator and which can be adjusted by means of the respective piezoactuator. If the object is to be moved instead of the scanning beam, optical tweezers which can be adjusted, preferably by means of piezoactuators, can be provided to adjust the object to be examined relative to the scanning light beam.

Regardless of whether the relative motion between the scanning light beam and object is caused by adjusting the direction of the scanning light beam or by changing the position of the object, the scanner arrangement can have a coarse scanner unit which provides for coarse motions between the scanning light beam and the object, and the piezoactuators or the optical tweezers can be part of a fine scanner unit.

The system described here can thus be used, especially, to expand classical scanning systems by a small, much faster zoom region. In this zoom region, accurate and prompt addressing of individual points will become possible. In this way, in an object of interest, any uninteresting background, which often comprises a large part of the video information, can be masked out (i.e. not scanned at all). The piezoactuators can also be used in cooperation with galvanometer scanners to accelerate the entire system, i.e. they can be used to compensate for errors and harmonics of the scanner and to bring the sinusoidal form of its motion closer to the desired sawtooth shape.

The aforementioned object is achieved by a point-scanning luminescent microscope of the initially mentioned type which is equipped with a confocal diaphragm, the detector arrangement having a surface sensor, especially a CCD chip, which itself forms the confocal diaphragm. Here, the surface sensor can be designed such that the intensity information of exposed pixels of the surface sensor is pushed into a storage zone of the surface sensor during the scanning process.

In almost all currently available confocal microscopes, photomultipliers are used as detectors. Their main advantage is an extremely low dark noise which enables detection of individual photons, but their main defect is low quantum yield, which exceeds the 20% boundary only in the spectral range below 500 nm. On the other hand, CCD chips can have quantum yields greater than 90% even above 500 nm, and the newest generation of these chips can be read out with noise established likewise in the range of a few electrons. In the concept proposed by Brakenhoff et al. ("Confocal imaging with bilateral scanning and array detectors", G. J. Brakenhoff, K. Visscher, Journal of Microscopy, vol. 165, Pr 1, January 1992, pp. 139–146) these CCD chips are likewise installed in a confocal microscope, but here the light beam, after passing through the confocal diaphragm, once again traverses a two-dimensional scanning device which places the light beam in the image plane again at a point which corresponds to the original pixel. After completion of the combined scanning/descanning process, thus, a confocal image can be picked up on the surface sensor (CCD chip). The process allows only a single diameter of the confocal diaphragm which corresponds to the size of one pixel.

In this concept, the CCD chip itself functions as a (variable) confocal diaphragm which is read out synchronously with the scanning process. For this reason, the intensity information of the exposed pixel is pushed continuously, or preferably pulsed in the interim period between the adjacent scanning points, into the storage zone of the chip from which it can be continuously read out. As a result, the electronic shift frequency of the chip should be much greater than the described scanning frequency of the microscope. By corresponding binning of individual pixels, either already during the read-out process (on chip-binning) or later by means of a computer, the size of the confocal diaphragm can be freely varied and optically adapted to the circumstances.

In another embodiment of the invention, spectral information can be obtained when there is a dispersive element for splitting the light emitted by the object.

Additionally or alternatively to the approaches described above, the object of the invention is furthermore achieved by a point-scanning luminescent microscope of the initially mentioned type which is designed as a twin-photon fluorescent microscope, in accordance with the invention, the light source being designed to deliver rectangular pulses.

The twin-photon fluorescent microscope uses a nonlinear effect predicted in the 1930s and experimentally verified in the 1960s. Here, fluorophores are not excited by photons with an energy which corresponds to the energy difference between the base and the first excited electron state, but by half-energy photons, i.e. with twice the wavelength. One of the main advantages of this process is that slow light can penetrate much more deeply into biological tissue.

So that two photons can cooperate synergistically, they must arrive at the fluorophore more or less at the same time. This requires extremely high photon flux densities which are conventionally achieved by concentrating the continuous light output used onto very fast laser pulses (sub-picoseconds). With a fast sequence (usually 80–100 MHz) of these pulses, the necessary peak intensities are achieved and continuous loading of the preparation is minimized.

It is obvious that the required continuous output can be kept smaller, the shorter the applied pulses. For this reason, strenuous efforts have been made to suppress the pulse length at the site of the preparation below 100 fs. But now, it has been found that high photon flux densities can also have adverse effects on the preparation. Even if the mechanisms of the cell damage which occurs are not completely understood, it can now be assumed that they are accompanied by the occurrence of simultaneous 3-, 4- and multi-photon absorption. It follows from Poisson statistics that, with a high probability of the desired twin-photon absorption, unwanted multi-photon absorption can be expected. The action of this multi-photon absorption corresponds to UV light exposure which damages biological systems, as is generally known.

Accordingly, in accordance with this invention, a process is proposed which ensures optimum signal quality with minimum sample burden. It follows from the consideration that a reduction of the peak intensities does reduce the probability of the desired twin-photon absorption, but even more, that of the unwanted multi-photon absorption. To achieve the same signal intensity, when the peak intensity is reduced by a factor n, the pulse must become $n^2$ longer, and thus, the continuous load must be raised by a factor $n^2/n=n$. Viewed in this way, the load by unwanted multi-photon absorption during continuous illumination would be least, but the continuous load on the sample would be unacceptably high. One example will illustrate this: If the intention is to achieve the same signal intensity with continuous light as with a 100 MHz sequence of 100 fs pulses, the continuous load would have to be increased by a factor $(10^5)^{-\frac{1}{2}}$, i.e. by more than 300 times. This is, of course, unrealistic since photons in the near IR range are absorbed by water and the biological material would thus be "cooked." Therefore, the optimum pulse length for twin-photon microscopy must be somewhere between 100 fs pulses and continuous light. The process described here is, therefore, designed to apply the optimum pulse length, not with the conventionally used Gaussian pulse shape, but as a rectangular pulse, since a rectangular pulse offers maximum twin-photon excitation with minimum continuous light loading. The effective optimum pulse length which can be different for different preparations can be determined by simple experiments.

In another configuration of the invention, these rectangular pulses can be easily produced with high edge steepness by their being composed of several short successive individual pulses. For this reason the light source can have an arrangement for producing pulses with a stipulated polarity and at least two windows of an optically anisotropic medium with an optical axis which runs parallel to the pulse propagation direction, the thickness of the individual windows in the pulse propagation direction being twice the thickness of the window preceding in the pulse propagation direction and each window being located turned 45 degrees relative to the window which is adjacent at the time. Other known methods for producing a rectangular time profile are also usable (for example, two diffraction gratings). It should be noted that all individual pulses in the pupil of the objective lens have a uniform local distribution in the object plane, since point imaging, which is diffraction-limited, is ensured only in this way.

The object of this invention is furthermore achieved by a point-scanning luminescent microscope which is designed for twin-photon fluorescent microscopy and in which an objective lens provided for illuminating the object is used, at the same time, for collecting some of the photons emitted by the object, a second detector being placed behind a condenser lens.

Twin-photon fluorescent excitation is a process essentially limited to the focus since only there do the required high peak intensities predominate. One consequence of this fact is that quasi-confocal images, i.e., images with three-dimensional information, can be recorded without the aid of a confocal "pinhole"; all of the light which is emitted at a given time from a sample must originate at the respective focal position. Thus, it is no longer necessary to use only the same optics which are used to generate the focal point for measuring emission, but simple arrangements can be accomplished which lead to a considerable increase of the collecting efficiency.

The simplest such arrangement uses, analogously to the prior art, an objective lens for generating the scanning illumination spot, and to collect the emitted photons, it uses not only the objective lens (so-called incident light fluorescence), but also a condenser lens placed on the opposite side. Since no imaging properties are required, a condenser lens of the highest numerical aperture (usually an oil condenser lens with NA=1.4) can be used which acquires up to 50% of all emitted light. Combined with an objective lens of high numeric aperture, thus collection efficiencies of over 70% can be achieved.

The object of this invention is furthermore achieved by a point-scanning luminescent microscope which is designed for twin-photon fluorescent microscopy, and in which in the beam path of the microscope there is a long-pass filter which allows long-wave excitation light to pass, but reflects the fluorescent light reflected by the object. In this way, the collecting efficiency can likewise be increased, but here, a second detector not being necessary, as in the just described concept.

If the long-pass filter is placed in the space between the objective lens and the tube lens, i.e., in the "infinite area" of the optical arrangement 14 in FIG. 1, all of the light collected by a the objective lens is focused back onto the sample and directed at the condenser lens where, together with the light coming directly from the sample, it can be collected with a single detector.

Since, in particular for highly scattering samples, the apparent visual field can often be much larger than the real one, for recording more strongly scattered emission light, preferably there are detection optics which are designed to collect the light both from the visual field of interest and also the light scattered in a scattering sample from a virtual visual field.

Alternatively, as much of the light emitted by the object as possible can also be acquired with a single detector placed behind the objective lens, when a mirror is attached such that it reflects back the light emitted in the transmission direction so that it can be collected together with the epifluorescent light by the objective lens. Preferably, the mirror surface is made dichroitic such that it transmits the excitation light and reflects only the light emitted by the object. When this mirror is made and/or placed suitably, the collecting efficiency can be greater than corresponds to the numerical aperture of the objective lens, then specifically if the numerical aperture of the light emitted in the transmission direction is reduced by the optical arrangement.

The object of this invention is furthermore achieved by a point-scanning luminescent microscope which is designed for twin-photon fluorescent microscopy, all the microscope optics being replaced by a single mirror arrangement. For example, in the beam path behind the object, a parabolic mirror is placed such that it produces a diffraction limited spot from the parallel excitation light at the object site, and in the beam path in front of the object, as the selection arrangement, a dichroitic beam splitter is located which separates the excitation light from the fluorescent light and allows the fluorescent light which is emitted by the object in the direction of the beam splitter, together with the fluorescent light reflected by the mirror arrangement, to be incident directly on the detector arrangement. In principle, instead of parabolic, also elliptical surfaces can be used to produce the diffraction-limited spot. Instead of a collimated excitation beam, a divergent beam bundle is used.

This parabolic mirror arrangement can be formed by a trough filled with immersion liquid, which has an inside wall which is mirrored, and which is covered with a cover glass which bears the object on its inner side facing the mirror arrangement, or it can be formed by a solid glass body which is flat on one side and which is parabolically shaped and mirrored on its other side, the glass body on its flat side being provided with an chamber filled with immersion liquid into which the object dips.

Preferred embodiments of the invention are described below with reference to the attached drawings.

DETAILED DESCRIPTION OF THE INVENTION

Figure 1:
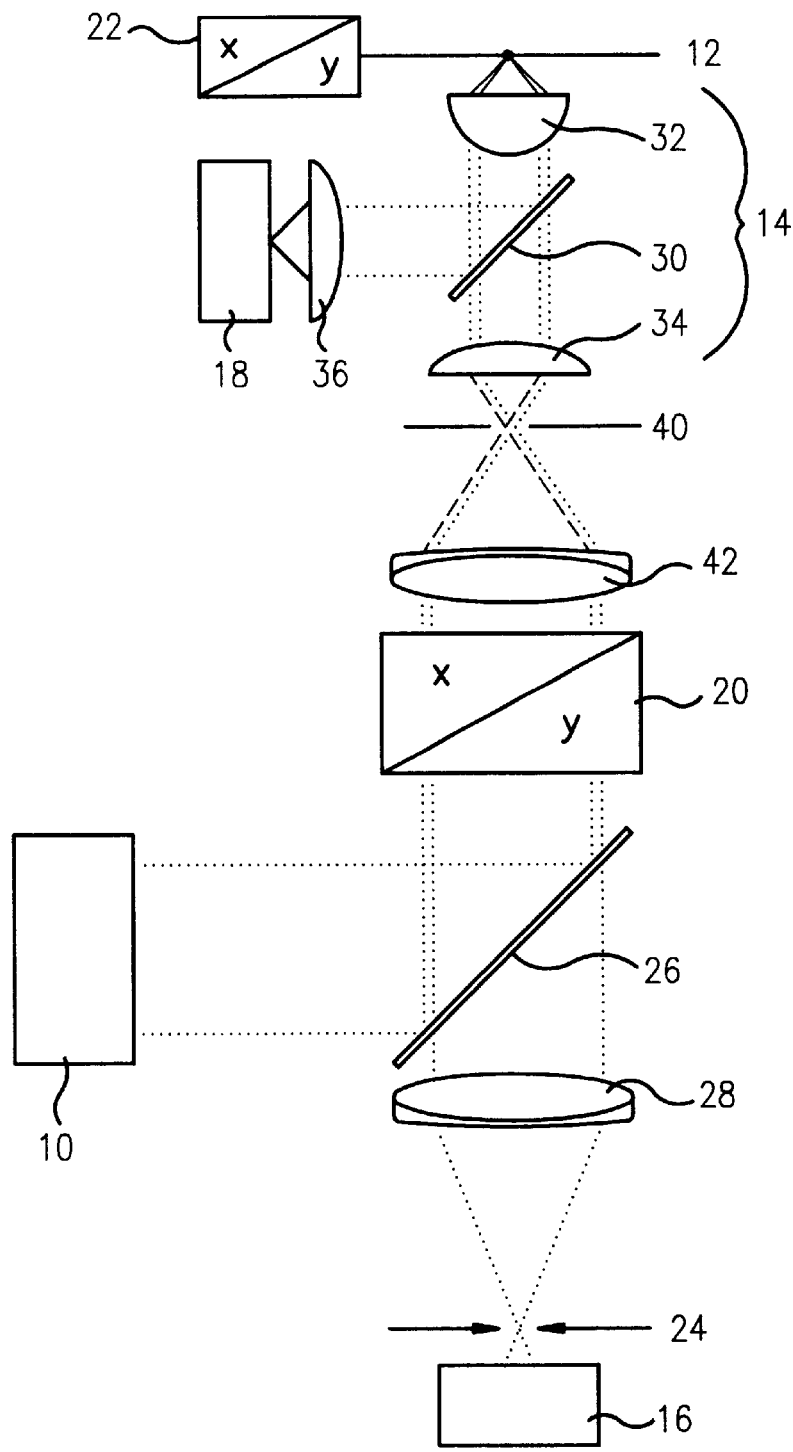
FIG. 1 is a schematic depiction of a known point-scanning luminescent microscope in which preferred embodiments of the invention can be accomplished.

As was described initially, FIG. 1 shows a point-scanning luminescent microscope having a scanning device 20 which moves the illumination spot relative to the object being examined. The scanning device 20 can, for example, be a galvanometric scanning device which provides for coarse positioning of the scanning light beam pointed at the object 12. For fine positioning of the illumination spot pointed at the object 12, the scanning device 20 can furthermore be provided with a scanning device as is shown schematically in FIG. 2 which is provided with piezoactuators 58, 60.

Figure 2:
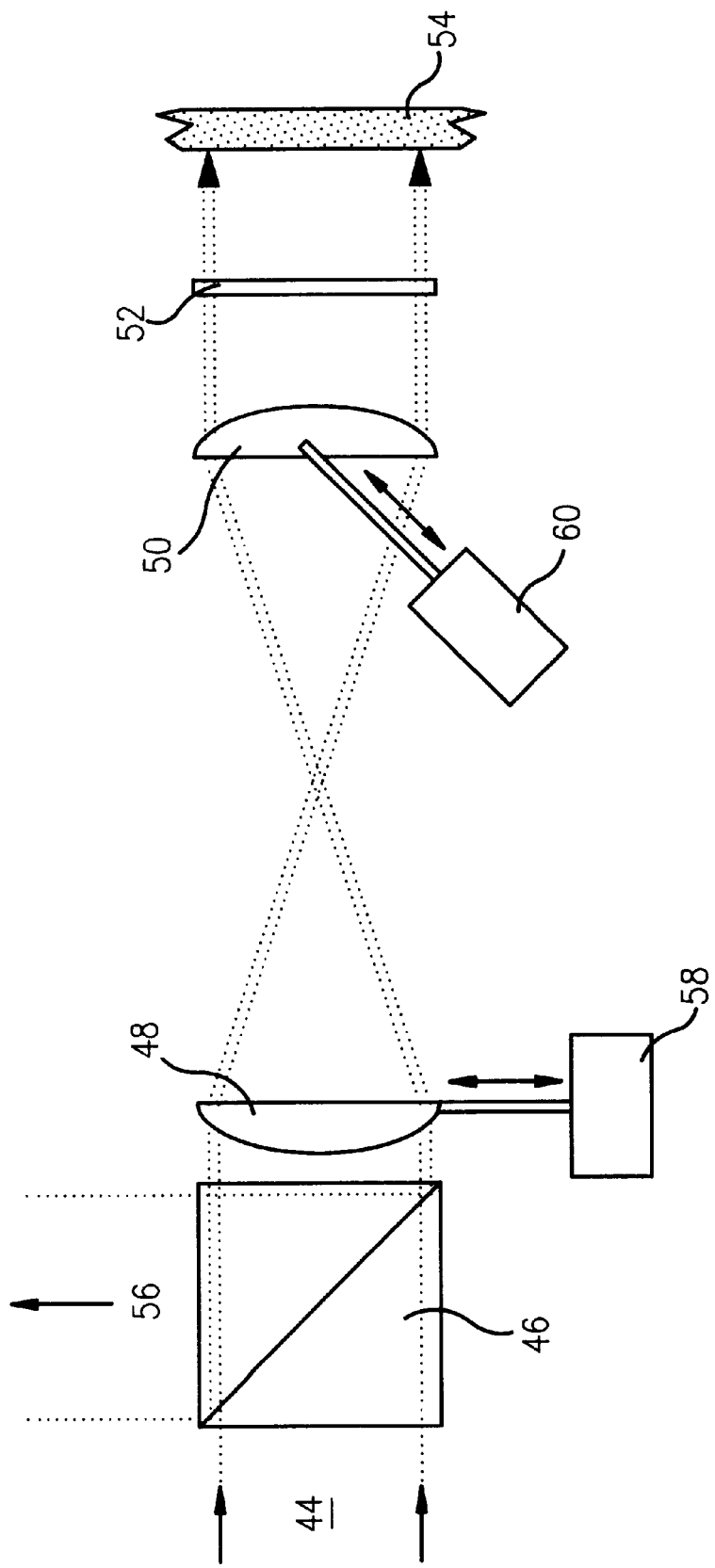
FIG. 2 is a schematic of a scanning device in accordance with the present invention for quick fine positioning.

Parallel polarized excitation light 44, for example, from a laser, is incident on the scanning device, as shown in FIG. 2, after passing through a polarization cube 46, is focused via a lens 48 onto an intermediate image plane, and is imaged by a second lens 50 again into infinity. The beam them passes through a $\lambda/4$ plate 52, is reflected by a flat mirror 54, and afterwards, traverses the arrangement backwards as far as polarization cube 46, where it is turned by 90 degrees as a result of the polarization, and is separated from the original beam 44 and guided in the direction of the arrow 56. The excitation light which can be deflected in the x-y direction in this way can either be supplied directly to a microscope or a coarse scanning device which allows greater deflections than the piezoactuators 58, 60 and only then to the microscope.

The arrangement shown here exploits the fact that, in a suitable optical arrangement, the movement of a lens by path x can cause movement of the pixel by the amount 2x. Furthermore, it makes it possible to mechanically decouple the movement of the beam in the x and y direction from one another. Almost any existing scanning system can be easily retrofitted with the arrangement shown. The arrangement can be placed as a small compact unit between the light source 10 shown in FIG. 1 and the scanning device 20, or can form part of the scanning device 20. The scanning device shown is also suitable for use in a reflection microscope.

One second practical scanning technique is the so-called object scan process in which a scanning device (scanning device 22 in FIG. 1) moves the preparation to be examined relative to a then fixed focal point. The advantage of this approach is the drastically reduced requirements for optical quality (planarity) of the optical system. Its main defect is the slowness which accompanies the mechanical movement of the object. Therefore, in the embodiment shown in FIG. 3, the object 12 to be examined is not moved together with its mount mechanically, but in its immersion medium using so-called optical tweezers 62 without contact. The luminescent microscope shown schematically in FIG. 3 has a similar structure to the luminescent microscope shown in FIG. 1, but in the embodiment shown in FIG. 3 the light source 10 is arranged for producing the collimated excitation light such that the excitation light does not pass through the scanning device 20, but is directly imaged via the dichroitic beam splitter 30 and the objective lens 32 directly on the object 12 to be studied. Wherever the excitation light source was located in the embodiment shown in FIG. 1, in the embodiment shown in FIG. 3 there is another source for collimated light, this light, however, not being used as excitation light, but to move the sample 12, i.e. as optical tweezers 62. Analogously to fine positioning of the scanning beam, as was explained with reference to FIG. 2, the arrangement as shown in FIG. 3 can have a fine positioning arrangement as shown in FIG. 2, but here not the scanning light beam, but the collimated light beam being fine-positioned to hold and move the sample.

Figure 3:
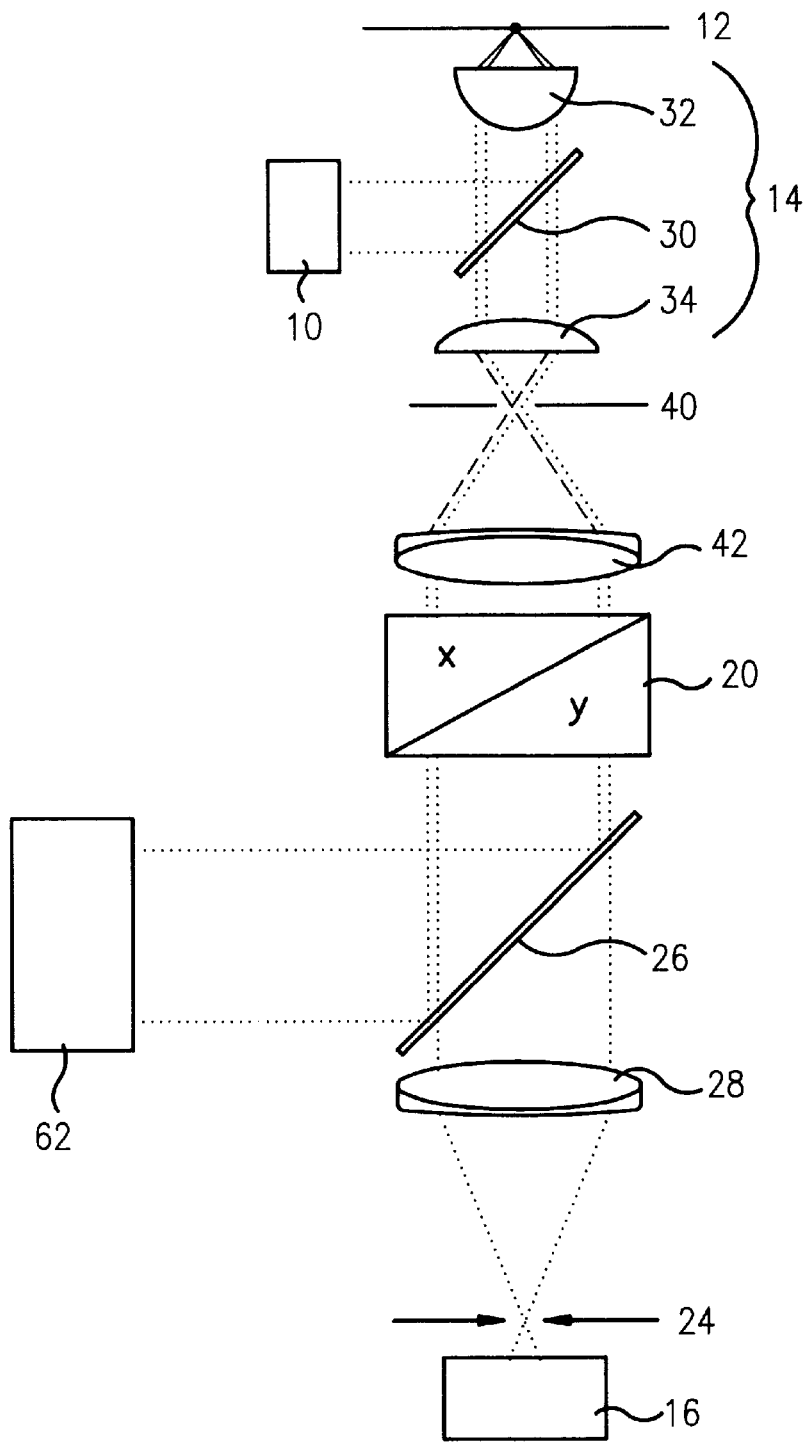
FIG. 3 is a schematic of a preferred embodiment of a point-scanning luminescent microscope in which optical tweezers are used for holding and moving the object to be examined.

The principle shown in FIG. 3 for the case of confocal imaging can be further simplified in the case of twin-photon excitation by omitting the confocal diaphragm 24 and/or by detection of the emission light between the objective lens 32 and scanning device 20.

With reference to FIG. 1, again, as was already mentioned above, preferably a CCD chip is used for acquiring an image, according to one preferred embodiment, the CCD chip itself acting as a variable confocal diaphragm 24, and for this reason, the CCD chip being read out synchronously with the scanning process. In this case, the intensity information of the exposed pixel during the scanning process is pushed continuously, or in pulses in the interim period between two adjacent scanning points, into the storage zone from which it can be continuously read out.

Figure 4:
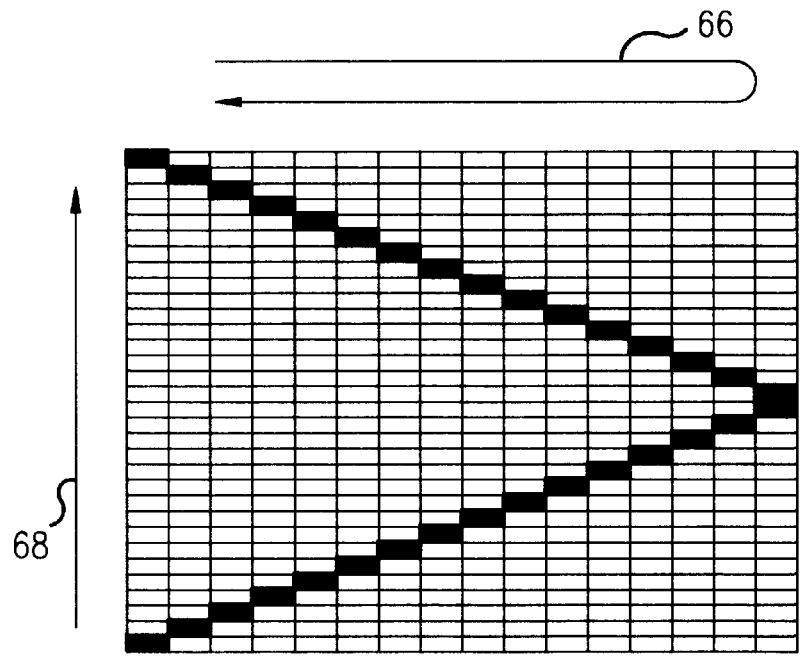
FIG. 4 is a representation of image acquisition by means of a CCD chip which is used as a confocal diaphragm.

But the arrangement works not only with a CCD detector in detector position 16, in this case the image of the emitting focus remaining stationary, but also, as shown schematically in FIG. 4, in the detector position 22, if the surface sensor is placed in the intermediate image plane. The luminous point thus moves according to the scanning motion over the sensor and the video information must be sorted later in the computer. In FIG. 4 arrow 66 indicates the scanning motion, while arrow 68 indicates the direction of line feed. This arrangement offers the additional advantage that the surface sensor in the image plane can also record entirely normal wide-field images, both in transmitted light and also in incident light fluorescence. The latter requires use of additional incident light illumination as is known in the prior art. To do this a polychromatic illumination unit can be used as is disclosed in DE 42 28 366 C2.

Figure 5:
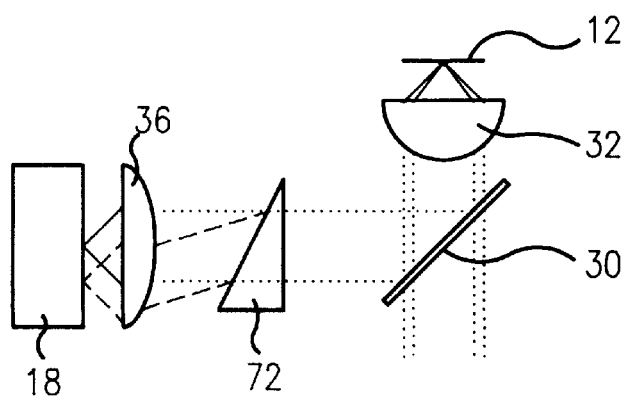
FIG. 5 is a schematic of an embodiment of a point-scanning luminescent microscope in which provisions are made for spectral splitting of the emission light.

Another advantage of this concept is that the emission light can be spectrally split, and this can be effected in the case of infinitely corrected microscope optics by introducing a dispersive element, for example, a prism or an optical grating, between the objective lens 32 and the tube lens 36. This arrangement is shown in FIG. 5 in which only the area of the device shown overall in FIG. 1 above the tube lens 34 is illustrated. Excitation light which passes through the dichroitic beam splitter 30 in FIG. 5, originating from below, is imaged via the objective lens 32 onto the object 12 to be examined. Light emitted from the object 12 is separated from the excitation light after passing through the objective lens 32 by means of the dichroitic beam splitter 30, is spectrally decomposed by a prism 72 and is imaged via the tube lens 36 onto a detector arrangement 18 which has a CCD surface sensor. Thus, the spectral range of the emission light is blurred to a few pixels. Therefore, the pixels are used not only as confocal diaphragms, but also as exit gaps of a spectrometer arrangement, the inlet gap being formed by the illuminating focal point. Then, spectral information can be obtained from a spatial assignment of individual pixels.

If excitation of the object being examined takes place as described initially by means of dual-photon absorption, according to preferred embodiments of the point-scanning luminescent microscope described here, rectangular excitation light pulses can be used with which an optimally long pulse length can be achieved to prevent undesirable multi-photon absorption with minimum continuous loading.

Rectangular pulses with a length of greater than 100 fs can be assembled from short individual pulses, for example, by using an etalon, but other processes which are prior art can also be used for this purpose.

Figure 6:
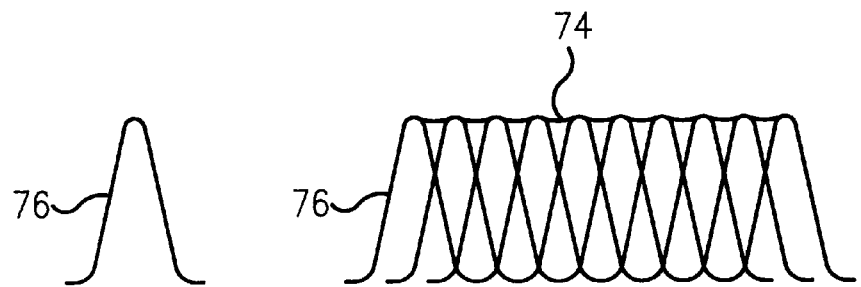
FIG. 6 chematically depicts a rectangular pulse for excitation of a sample to be examined.
Figure 7:
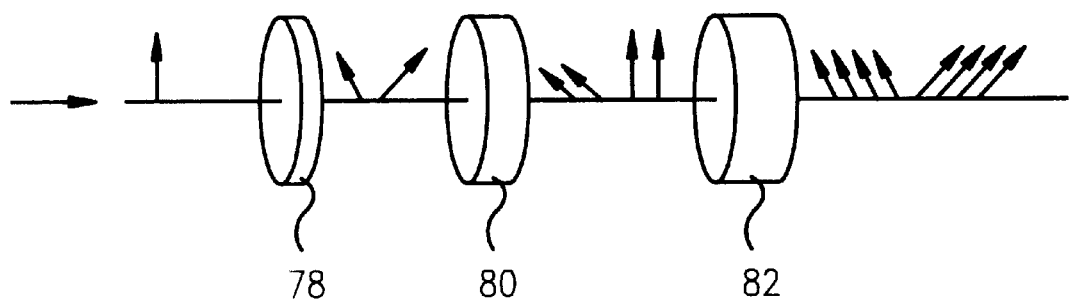
FIG. 7 shows a schematic of an arrangement with which rectangular pulses as per FIG. 6 can be produced.

FIGS. 6 and 7 show the generation of a (more or less) rectangular pulse using several individual pulses. Rectangular pulses 74 with a length of a few hundred femtoseconds up to some picoseconds can, as shown in FIG. 6, be assembled from short individual pulses 76. In the implementation shown in FIG. 7, a window 78 of an optically anisotropic medium such as crystalline quartz or calcite can be inserted into the beam such that a laser pulse with a stipulated polarity (which should be located exactly between the two preferred directions of the window material) is split into two pulses which are time delayed relative to one another with a polarization perpendicular to one another. A second window 80 which is twice as thick as the first window 78 and is formed of the same material but which is turned relative to the first window 78 by 45° then produces a quadruplet which is extended in time, the first two and the last two pulses each having the same polarization plane. With a third window 82, which is in turn doubled in thickness and which again must have the same orientation as first window 78, splitting takes place into 8 pulses equidistant in time. As FIG. 7 shows, windows 78, 80 and 82 are arranged such that their optical axis runs parallel to the laser beam shown as an arrow. Nothing prevents optional continuation of the principle for producing even longer pulses. It is interesting that in the reverse arrangement in which the beam is guided first through the thickest window, a rectangular pulse of the same length results which however is composed of individual pulses of alternating polarity.

Figure 8:
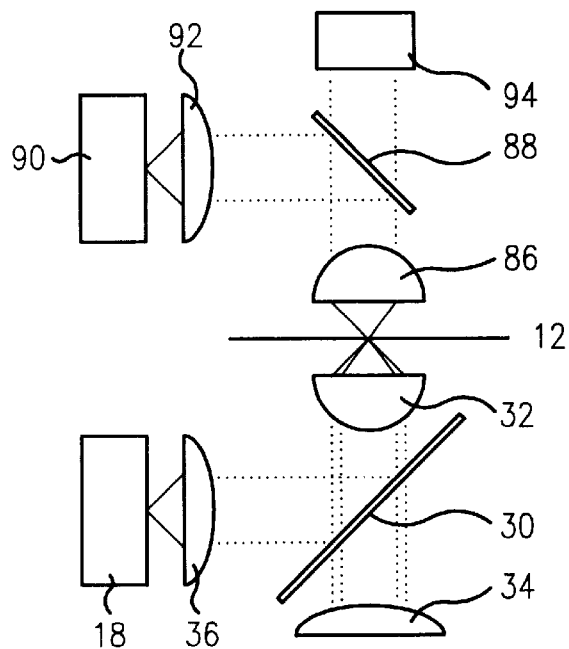
FIG. 8 is a schematic of an arrangement with which simultaneous detection of emitted photons can be achieved in the objective and condenser lens beam path.

FIG. 8 schematically shows one embodiment of a luminescent microscope in which, as described initially, twin-photon fluorescent excitation is used. In FIG. 8, the parts of the luminescent microscope shown in FIG. 1 underneath the tube lens 34, i.e. the intermediate image plane 40, the scanning lens 42, etc. are not shown, for the sake of simplicity. The arrangement shown in FIG. 8, analogously to the prior art, uses the objective lens 32 to produce the scanning illumination spot, but to collect the emitted photons, it uses not only the objective lens 32 (so-called incident light fluorescence), but also a condenser lens 86 which is placed on the opposite side and by which the light emitted by the object 12 to be examined is imaged via a tube lens 92 onto a detector 90. If another dichroitic beam splitter 88 is inserted into the condenser lens beam path, as is shown in FIG. 8, the condenser lens 86 can be used for transmitted light illumination of the object 12 as well using a light source 94.

Figure 9:
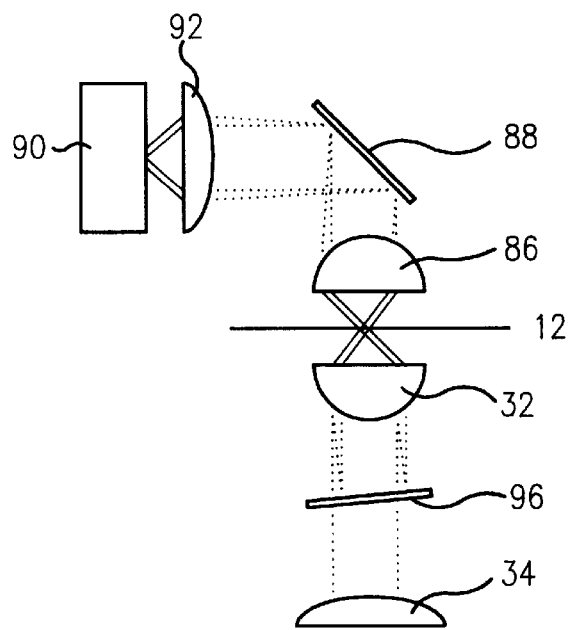
FIG. 9 is a view similar to FIG. 8 showing an arrangement by means of which detection of all photons emitted in all space directions takes place with the condenser lens.

The aforementioned concept can also be implemented without a second detector as is shown in FIG. 9, by placing a long-pass filter 96 in the beam path of the optical arrangement 14 (see FIG. 1). The long-pass filter 96 allows the long-wave excitation light to pass and reflects the fluorescent light emitted by the object 12 to be examined. If the filter 96 is placed in the space between the objective lens 32 and the tube lens 34, i.e., in the "infinite area" of the optical arrangement 14, all the light collected by the objective lens 32 is focused back onto the object 12 and pointed at the condenser lens 86 where, together with the light originating directly from the sample 12, it can be collected with a single detector 90. Under certain circumstances, it can be advantageous to slightly tilt the filter 96 so that the emitted light is not reflected back directly to its origin. FIG. 9 shows, furthermore, a dichroitic beam splitter 88 which enables use of transmitted light illumination according to FIG. 8.

Figure 10:
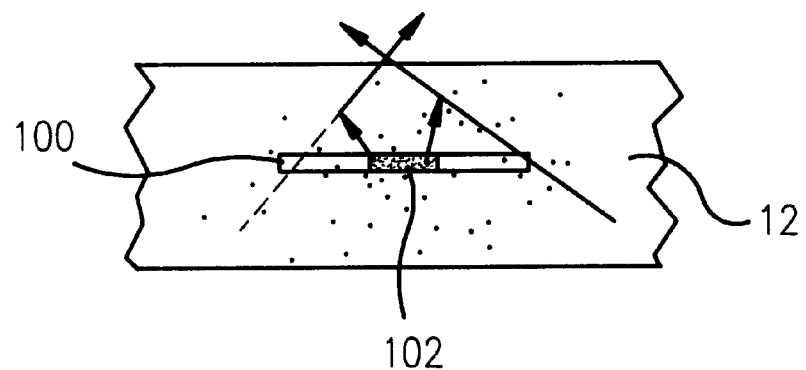
FIG. 10 is a schematic of an enlargement of the apparent visual field caused by scattering of light compared to the real visual field of a scattering object.

To use the major advantages of twin-photon fluorescent microscopy, especially for highly scattering preparations, not only the emitted light should be collected at as large a solid angle as possible, but as large an image field area as possible should also be acquired with the detector, since, as shown schematically in FIG. 10, as a result of light scattering, the apparent visual field 100 can be much larger than the real visual field 102 which is of interest, of a scattering object 12 to be examined. For this reason, a large-area detector is usually necessary, or an optical arrangement which focuses the collected light again onto the detector.

In the study of living biological tissue, the use of a so-called water immersion objective lenses is often recommended, in which the preparation floats in a physiological saline solution that acts, simultaneously, as the immersion liquid. These objective lenses can be produced with a long working interval, but their numerical aperture is greatly reduced as compared to oil immersion objective lenses. The collecting efficiency of an optical system with water immersion can be increased with the aid of a condenser lens to values over 40%, but when suitable mirrors are used, much higher efficiencies can be accomplished at not too great a cost.

Figure 11:
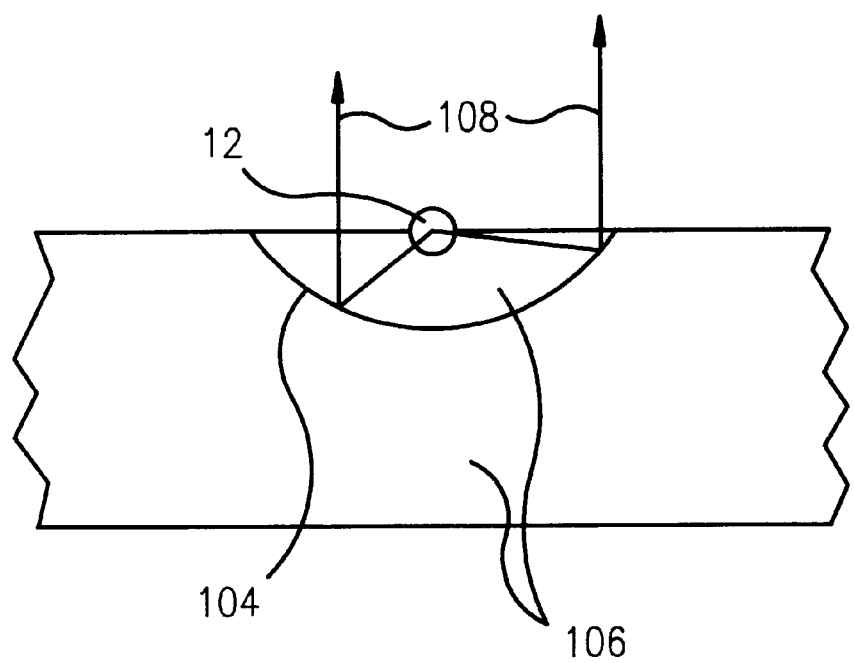
FIG. 11 shows an optical system with which as large a proportion as possible of the light emitted by an object to be examined can be acquired by the objective lens.

FIG. 11 shows an optical system in which a mirror surface 104 is located in a material 106 which has the same refractive index both in front of and behind the mirror surface 104, reflecting back a considerable part of the fluorescent light emitted in the direction facing away from the objective lens (arrow 108), such that it can be collected again by the objective lens and recorded behind it. With a corresponding design of the reflecting surface, the numerical aperture of the emitted light can be reduced so that the objective lens can collect a larger solid angle than would correspond to its own numerical aperture. The mirror surface 104 is preferably spherical since this is easiest to do. But, the mirror surface can also be a spherical, for example, parabolic or elliptical. A flat mirror can also cause the same effect, when it is placed in the condenser lens at a proper location. If the mirroring is laid out to be "dichroitic," on this occasion, the excitation light and the emission light can be separated from one another by the excitation light being able to pass the through dichroitic surface, while the emission light is reflected. Simple implementation of this concept calls for working the reflecting surface into the specimen slide. Thus, at least for the spectral range transmitted by the mirror surface, the conventional condenser lens arrangement can be used for transmitted light illumination.

Figure 12:
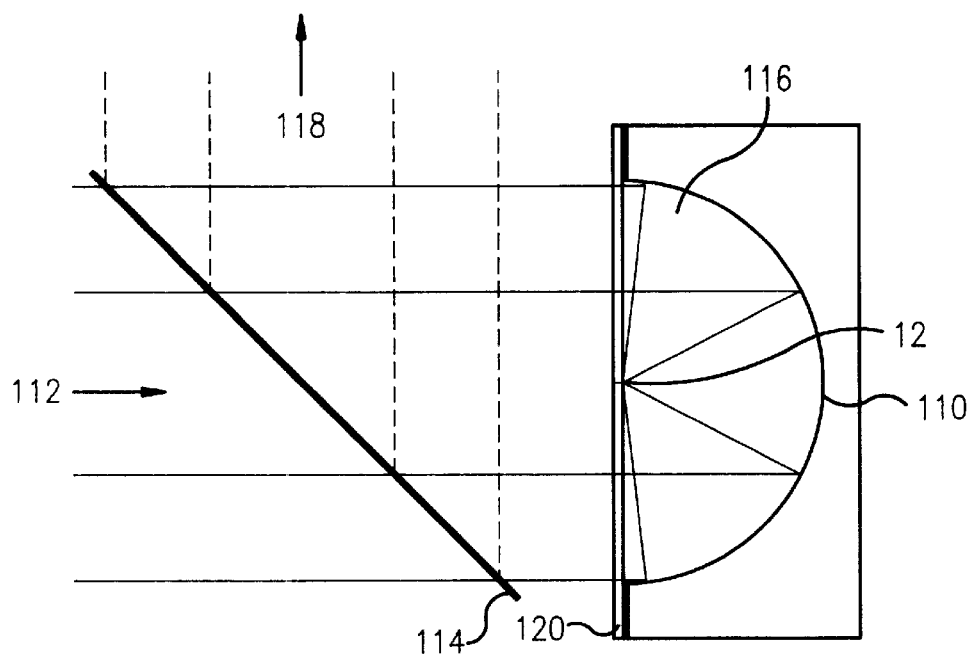
FIGS. 12 and 13 show embodiments of the system of FIG. 11 in which an objective lens, in the classical sense, can be omitted.
Figure 13:
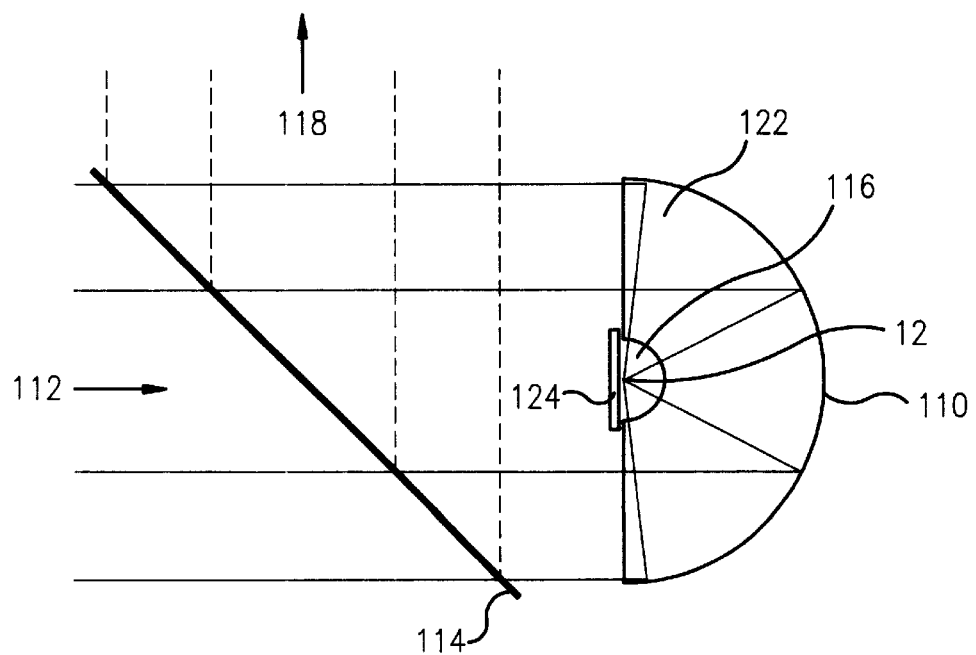
Figure 14:
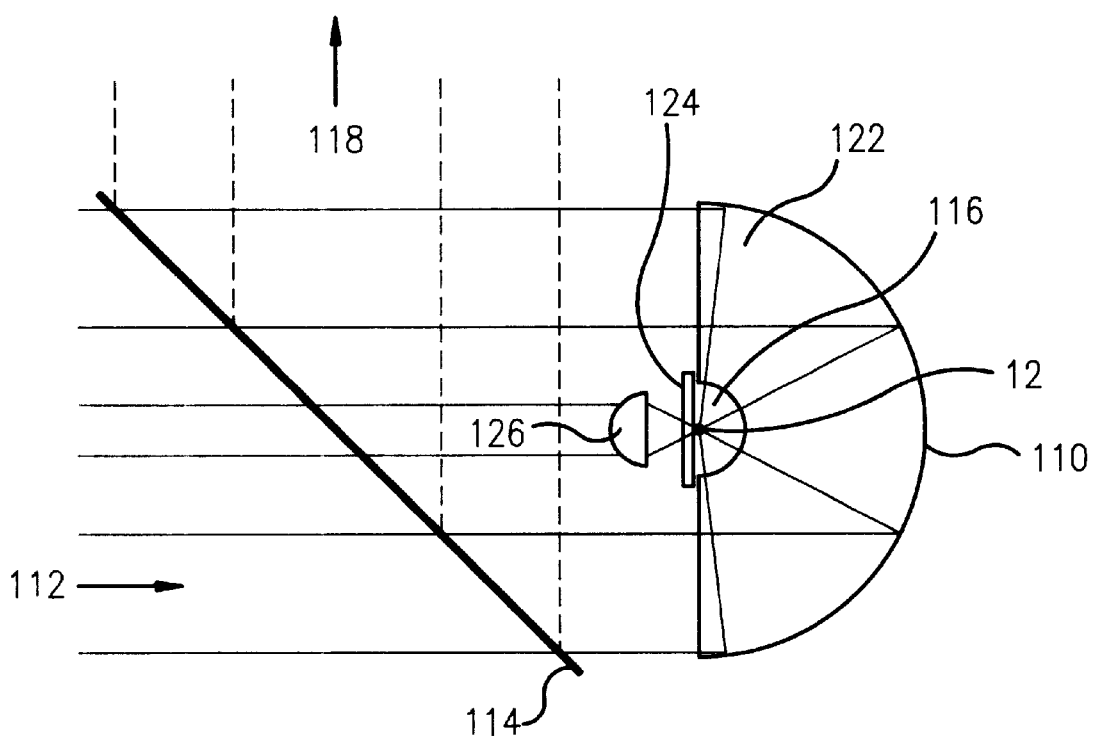
FIG. 14 shows a view of an optical system similar to that of FIG. 13 in which an object to be examined can be illuminated from two opposite sides.

The version of the addressed mirror concept shown in FIGS. 12 to 14 makes do without using an objective lens. By means of a parabolic mirror arrangement 110, a diffraction-limited spot is produced from the parallel excitation light 112 at the location of the sample 12. By means of an extremely large angular range of the beams used for focus formation, a resolution can be obtained in this spot which could only be achieved to date with a so-called 4 πi arrangement. To detect the emission light, a dichroitic beam splitter 114 must be placed in the beam, by means of which the emission light 118 to be imaged on the detector is decoupled from the beam path of the excitation light 112. Due to the fact that optical imaging by mirror systems is indeed achromatic, but is only free of aberration directly at the focus, scanning of the preparation in the x, y and z directions by moving the sample 12 or the parabolic mirror 110 is recommended, or using optical tweezers (see FIG. 3, optical tweezers 62).

One simple implementation of this concept, as is shown in FIG. 12, comprises a trough filled with immersion liquid 116 which has an inside wall provided with mirroring 110. A cover glass 120 forms the cover of the trough, the preparation being placed on the inside of the trough. Since the sample 12 comes directly into contact with the immersion liquid 116, the former should be selected to be compatible with the preparation. For biological preparations, a physiological saline solution is recommended.

A second implementation concept shown in FIG. 13 calls for a massive glass body 122 which is flat on one side and parabolic on the other. The mirroring 110 is attached on the outside of the parabolic surface. The sample 12 projects into a hemispherical chamber which is filled with a suitable immersion liquid 116 and is closed by a cover glass 124.

The concept shown in FIG. 13 can be advantageously combined with devices known from the prior art by, as shown in FIG. 14, introducing another microscope objective lens 126 into the beam path, and thus, confocally illuminating the sample 12 from two opposite sides. For the case in which scanning takes place by moving the mirror arrangement, the preparation being fixed by means of optical tweezers, or by moving the preparation by means of optical tweezers with the mirror arrangement stationary, a cover glass can be dispensed with. This, and the fact that emitted photons are also collected from two hemispheres, imparts a previously unattained resolution to the arrangement.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Point-scanning luminescent microscope, especially for studying biological objects, with at least one collimated light source for producing an excitation light beam, an optical arrangement which focuses the light of the excitation light source on an object to be studied, at least one detector arrangement for acquiring light emitted by the object, an optical arrangement which collects the light emitted by the object and supplies it to the detector arrangement, and a scanner arrangement which causes relative movement between a scanning light beam and the object in at least two directions, the luminescent microscope being a twin-photon fluorescent microscopy microscope in which the light source has means for delivering light as rectangular pulses.

2. Point-scanning luminescent microscope as claimed in claim 1, wherein each rectangular pulse is comprised several short successive individual pulses.

3. Point-scanning luminescent microscope as claimed in claim 1, wherein the light source has an arrangement for producing pulses with a stipulated polarity and at least two windows of an optically anisotropic medium with an optical axis which runs parallel to the pulse propagation direction, the thickness of the individual windows in the pulse propagation direction being twice the thickness of the window preceding in the pulse propagation direction, and each window being located turned 45° relative to the window adjacent thereto.

4. Point-scanning luminescent microscope as claimed in claim 1, wherein a mirror surface is provided in a beam path behind the object, the mirror surface being configured such that it reflects back fluorescent light emitted by the object in a direction of the excitation light to the objective lens.

5. Point-scanning luminescent microscope with at least one collimated light source for producing an excitation light beam, an optical arrangement which focuses the light of the excitation light source on an object to be studied, at least one detector arrangement for acquiring light emitted by the object, an optical arrangement which collects the light emitted by the object and supplies it to the detector arrangement, and a scanner arrangement which causes relative movement between a scanning light beam and the object in at least two directions, the luminescent microscope being a twin-photon fluorescent microscopy microscope having an objective lens for illuminating the object and for, at the same time, collecting photons emitted by the object; and wherein a second detector is located behind a condenser lens of the objective lens.

6. Point-scanning luminescent microscope as claimed in claim 5, wherein detection optics are provided which collect both light from a visual field of interest and also light scattered in a scattering sample from a virtual visual field.

7. Point-scanning luminescent microscope as claimed in claim 5, wherein a mirror surface is provided in a beam path behind the object, the mirror surface being configured such that it reflects back fluorescent light emitted by the object in a direction of the excitation light to the objective lens.

8. Point-scanning luminescent microscope with at least one collimated light source for producing an excitation light beam, an optical arrangement which focuses the light of the excitation light source on an object to be studied, at least one detector arrangement for acquiring light emitted by the object, an optical arrangement which collects the light emitted by the object and supplies it to the detector arrangement, and a scanner arrangement which causes relative movement between the scanning light beam and the object in at least two directions, the luminescent microscope being a twin-photon fluorescent microscopy microscope having a long-pass filter in a beam path of the microscope, the long-pass filter allowing long-wave excitation light to pass, but reflecting fluorescent light reflected by the object.

9. Point-scanning luminescent microscope as claimed in claim 8, wherein the long-pass filter is located in a space between the object and a tube lens; and wherein a detector is provided in the beam path behind a condenser lens of an objective lens.

10. Point-scanning luminescent microscope as claimed in claim 9, wherein the long-pass filter is arranged to focus light collected by the objective lens back onto the object and to direct it to the condenser lens.

11. Point-scanning luminescent microscope as claimed in claim 9, wherein the long-pass filter is slightly tilted with respect to an axis of the beam path such that the light emitted by the object is not reflected back directly to its origin.

12. Point-scanning luminescent microscope as claimed in claim 8, wherein detector has detection optics which collect both the light from a visual field of interest and also light scattered in a scattering sample from a virtual visual field.

13. Point-scanning luminescent microscope as claimed in claim 8, wherein a mirror surface is provided in a beam path behind the object, the mirror surface being configured such that it reflects back fluorescent light emitted by the object in a direction of the excitation light to the objective lens.

14. Point-scanning luminescent microscope as claimed in claim 8, wherein the mirror surface is dichroitic such that it transmits the excitation light and reflects essentially only light emitted by the object.

15. Point-scanning luminescent microscope as claimed in claim 13, wherein the mirror surface is spherical.

16. Point-scanning luminescent microscope as claimed in claim 13, wherein the mirror surface is a spherical.

17. Point-scanning luminescent microscope as claimed in claim 13, wherein the microscope is for studying biological objects, and the mirror surface is formed in a specimen slide.

18. Point-scanning luminescent microscope with at least one collimated light source for producing an excitation light beam, an optical arrangement which focuses light of the excitation light source on an object to be studied, at least one detector arrangement for acquiring light emitted by the object, an optical arrangement which collects the light emitted by the object and supplies it to the detector arrangement, and a scanner arrangement which causes relative movement between the scanning light beam and the object in at least two directions, the luminescent microscope being twin-photon fluorescent microscopy microscope having a parabolic mirror arrangement in a beam path behind the object for producing a diffraction-limited spot from parallel excitation light at the object site; and wherein a dichroitic beam splitter is located in a beam path in front of the object as a selection arrangement which separates the excitation light from fluorescent light emitted by the object and allows the fluorescent light which is emitted by the object in the direction of the beam splitter together with the fluorescent light reflected by the mirror arrangement to be incident directly on the detector arrangement.

19. Point-scanning luminescent microscope as claimed in claim 18, wherein one of the object and the mirror arrangement is adjustable by means of the scanner arrangement.

20. Point-scanning luminescent microscope as claimed in claim 18, further comprising a trough filled with an immersion liquid, the trough having an inside wall which is mirrored to form the parabolic mirror arrangement and which is covered by a cover glass which bears the object on an inner side facing the mirror arrangement.

21. Point-scanning luminescent microscope as claimed in claim 18, further comprising a solid glass body which is flat on one side and which is parabolically shaped on another side to form the parabolic mirror arrangement, an outer side of the parabolically shape surface being mirrored; and wherein the glass body has a chamber filled with an immersion liquid into which the object dips is provided on its flat side.

* * * * *